Aug. 23, 1938.  H. W. PRICE ET AL  2,127,752
CLUTCH CONTROL MECHANISM
Filed May 31, 1935  2 Sheets-Sheet 1

INVENTOR.
HAROLD W. PRICE
BY EARL R. PRICE
H. O. Clayton
ATTORNEY

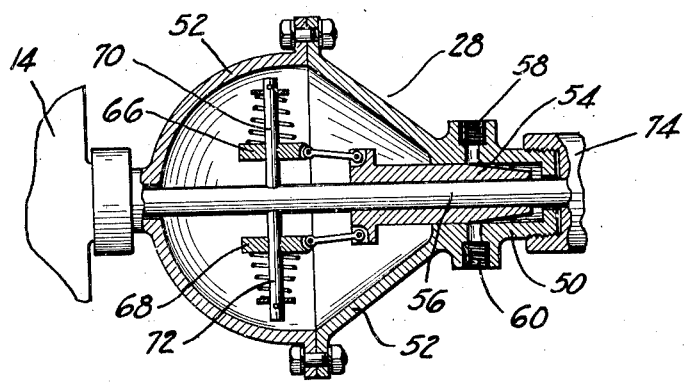
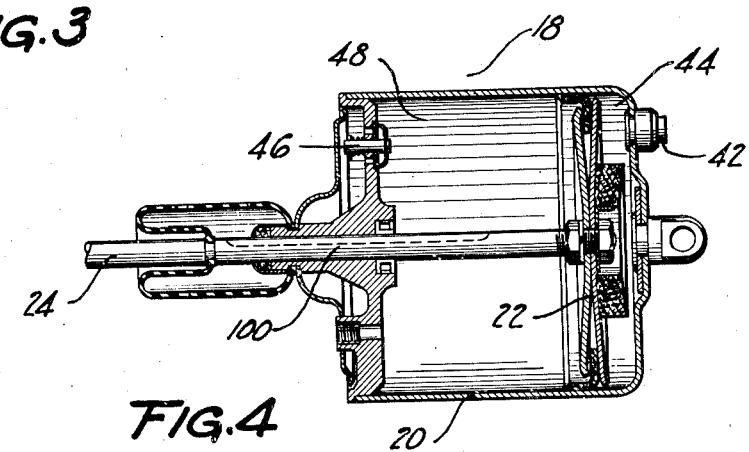

Patented Aug. 23, 1938

2,127,752

UNITED STATES PATENT OFFICE 2,127,752

CLUTCH CONTROL MECHANISM

Harold W. Price and Earl R. Price, South Bend, Ind., assignors to Bendix Products Corporation, South Bend, Ind., a corporation of Indiana Application May 31, 1935, Serial No. 24,305

6 Claims. (Cl. 192—.01)

This invention relates in general to clutch operators, and more particularly to power means for operating the clutch of an automotive vehicle.

The principal object of the invention is to provide a pressure differential operated motor for disengaging the clutch and subsequently controlling the engagement thereof in accordance with both the speed of the vehicle and the speed of its engine. To this end the clutch is operated by a motor, which may be of the double-ended type, both the time of operation and the mode of operation of its clutch connected power element being controlled by the gaseous pressure within the motor. The pressure in turn is pref15 erably controlled by an accelerator operated three-way valve to initiate the clutch controlling operations of the motor and by a plurality of bleed valves for controlling the clutch engaging operation of the motor, said valves being opera20 tive by and in accordance with the speed of the vehicle and its engine.

Other objects and desirable features of the invention will be apparent from the following specification taken in conjunction with the draw25 ings, in which:

Figure 3 is a sectional view of the governor operated bleed valve of Figure 1;

Figure 4 is a sectional view of the clutch operating pressure differential operated motor of Fig35 ure 1.

Figure 1:
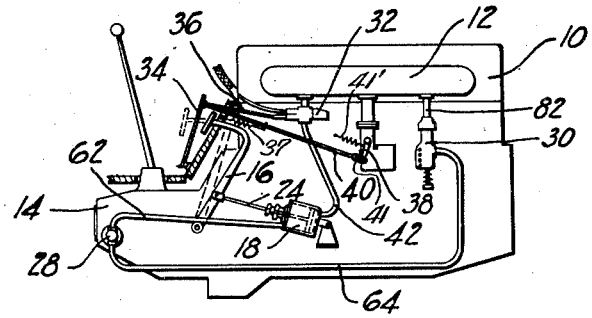
Figure 1 is a diagrammatic view of the essential features of a preferred embodiment of the invention.

There is disclosed in the embodiment of Figure 1 an internal-combustion engine 10 having an intake manifold 12, a conventional three-speeds forward and reverse transmission 14, and a clutch operating lever 16 operatively connected to a clutch, the latter interconnecting, in the usual manner, the engine and transmission.

The invention is directed to power means for so operating the clutch as to simulate a conventional manual operation thereof. To this end a pressure differential operated motor 18, comprising a cylinder 20 and a piston 22, is operably connected by a link 24 to the lever 16, the latter being operatively connected to a conventional clutch, not shown. The aforementioned lever, constituting a conventional manually operable clutch pedal, may be operated to control the clutch in the event that the power means for operating the same is for any reason rendered inoperative.

Figure 2:
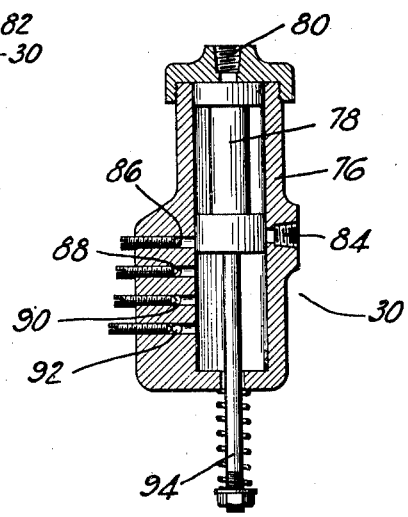
Figure 2 is a sectional view of the automatically operable power operated bleed valve of Figure 1.
Figure 5:
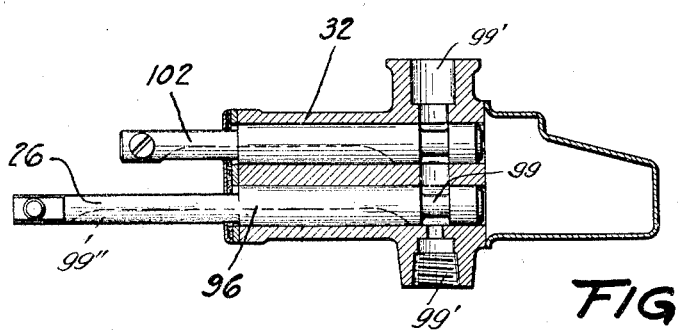
Figure 5 is a sectional view of the manually operated valve unit of Figure 1.

Both the time and mode of operation of the motor 18 in operating the clutch is determined by the gaseous pressure within the same, and such pressure is controlled by a three-way valve 26 and bleed valves 28 and 30, disclosed in detail in Figures 2, 3 and 5. The three-way valve of Figure 5 is housed within the lower portion of a valve unit 32, Figure 1, said valve being operable by an accelerator 34 through a connection 36. The accelerator, returned to its off position by a spring 37 also performs its usual function of operating a throttle lever 38 connected thereto by a link 40. The link 40 is provided with a slot at 41 to provide a lost motion connection, whereby the throttle is closed before the aforementioned three-way valve is opened to initiate a disengagement of the clutch and the valve is opened to initiate an engagement of the clutch prior to an opening of the throttle. The throttle is returned to its off position by a spring 41'.

Upon release of the accelerator, the valve 26 is positioned to interconnect the intake manifold 12 with one end of the cylinder 20, such connection being made possible by a conduit 42. The manifold at closed throttle is partially evacuated, resulting in the evacuation of a right end compartment 44, Figure 4, of the cylinder. This results in the piston 22 being drawn to the right, under the load of atmosphere admitted through a check valve 46. The clutch is thus automatically disengaged with release of the accelerator.

Upon depressing the accelerator, the three-way valve 26 is operated to vent the compartment 44 to the atmosphere and thereby initiate a clutch engaging operation of the clutch motor. The mode of engagement of the clutch is determined by the gaseous pressure acting on the piston 22, the pressure within a left compartment 48 of the cylinder 20 being determined by the operation of bleed valves controlled respectively by the transmission and engine.

The bleed valve 28 preferably comprises a tubular end portion 50 of a hollow spherically shaped two-part casing 52, fixedly secured to the variable speed transmission casing 14, and a reciprocable tubular member 54 sleeved over a rod 56 and within the bore of the aforementioned end portion 50. Said portion is ported at 58 and 60, said ports being connected respectively with the compartment 48 of the cylinder 20 by a conduit 62 and with the bleed valve 30 by a conduit 64. The end of the reciprocable bleed valve member is tapered as disclosed in Figure 3 to progressively effect a greater flow of air through the conduits 62 and 64 as the member 54 is drawn to the left. The member 54 is operated by governor means comprising discs 66 and 68 freely sleeved over pins 70 and 72 secured to the rod 56, the latter being driven by the propeller shaft which is driven directly or through gears by the driven element of the clutch and serving to drive a speedometer mechanism through the medium of a connection 74. As the speed of the rod 56 increases the discs 66 and 68 are moved outwardly against springs to thereby draw the member 54 to the left, the degree of movement being directly proportional to the speed of the rod.

The remaining bleed valve 30, Figure 2, preferably comprises a tubular shaped casing 76 secured to the engine casing and housing a reciprocable spool shaped member 78. The casing is constructed to provide a port 80 connected to the manifold 12 by a conduit 82, a port 84 to receive the aforementioned conduit 64 and juxtaposed ports 86, 88, 90 and 92, the flow of air therethrough being adjusted by adjustable needle valve members. The valve 30 is thus pressure differential operated, being raised to the position disclosed in Figure 2 at closed throttle, at which time the manifold vacuum is substantially at its maximum. As the throttle is opened and the vacuum reduced, the valve is moved downwardly by a spring 94, uncovering one or more of the bleed openings 86 to 92 inclusive, depending upon the degree of manifold vacuum.

Release of the accelerator therefore effects a disengagement of the clutch and depression thereof initiates an engagement of the clutch. Inasmuch as the two bleed valves 28 and 30 are connected in series, it follows that in starting the vehicle, the driving mechanism from the driven clutch plate to the wheels being at that time static, the engagement of the clutch will be relatively slow due to the fact that the plunger 54 is at its extreme position to the right. With the vehicle in motion, however, the valve 30 acts as a check on the valve 28, inasmuch as the egress of air from the cylinder is controlled by said valve 30 as well as the valve 28: e. g., with the driven clutch plate rotating at high speed, the transmission being in high gear, the flow of air past the valve 28 is relatively rapid, the plunger 54 probably being moved to the extreme left. However, should the driver have merely slightly opened the throttle, the air flow via valve 30 would be blocked. The mechanism of the invention therefore insures a smooth engagement of the clutch under all driving conditions.

Although this invention has been described in connection with a certain specific embodiment, the principles involved are susceptible of numerous other applications that will readily occur to persons skilled in the art. The invention is, therefore, to be limited only as indicated by the scope of the appended claims.

We claim:

1. In an automotive vehicle provided with a transmission, an engine, and a clutch interconnecting the two, power means for controlling the operation of the clutch comprising a pressure differential operated motor, valve means for initiating the clutch disengaging and engaging operations of the motor, and a plurality of serially connected valves operated by the transmission and engine for controlling the clutch engaging operation of the motor.

2. In an automotive vehicle provided with an accelerator, a transmission, an engine, and a clutch connecting the two, power means for controlling the operation of the clutch comprising a pressure differential operated motor, accelerator operated valve means for initiating the clutch disengaging and engaging operations of the motor, and a plurality of serially connected power operated valves operated by the transmission and engine for controlling the clutch engaging operation of the motor.

3. In an automotive vehicle provided with an engine having an intake manifold, a transmission, and a clutch interconnecting the two, power means for operating the clutch comprising a pressure differential operated motor, and valve means for controlling the clutch engaging operation of the motor, said latter means including a valve operable in accordance with the speed of the driven clutch plate and another valve operable in accordance with the degree of vacuum of said intake manifold.

4. In an automotive vehicle provided with an engine having an intake manifold, a transmission, and a clutch interconnecting the two, power means for operating the clutch comprising a pressure differential operated motor, and valve means for controlling the clutch engaging operation of the motor, said latter means including a governor operated bleed valve operable in accordance with the speed of the transmission, and further including another bleed valve, in series with said aforementioned bleed valve, and operable in accordance with the degree of vacuum of said intake manifold.

5. In an automotive vehicle provided with a clutch, power means for operating the clutch comprising a pressure differential operated motor, valve means for initiating the clutch disengaging and engaging operations of said motor, a plurality of serially connected valves for controlling the clutch engaging operation of the motor, and means for operating said latter valves including means operable only when the vehicle is in motion.

6. In an automotive vehicle provided with an engine, a transmission, and a clutch interconnecting the two, power means for operating the clutch including a pressure differential operated motor, a three-way valve for initiating the clutch disengaging and engaging operations of the motor, a plurality of serially connected bleed valves for controlling the clutch engaging operation of the motor, and means for operating said latter valves comprising a transmission operated governor mechanism and further including a pressure differential operated mechanism operable in accordance with the vacuum within the intake manifold of the engine.

EARL R. PRICE.
HAROLD W. PRICE.